United States Patent Office 3,177,705
Patented Apr. 13, 1965

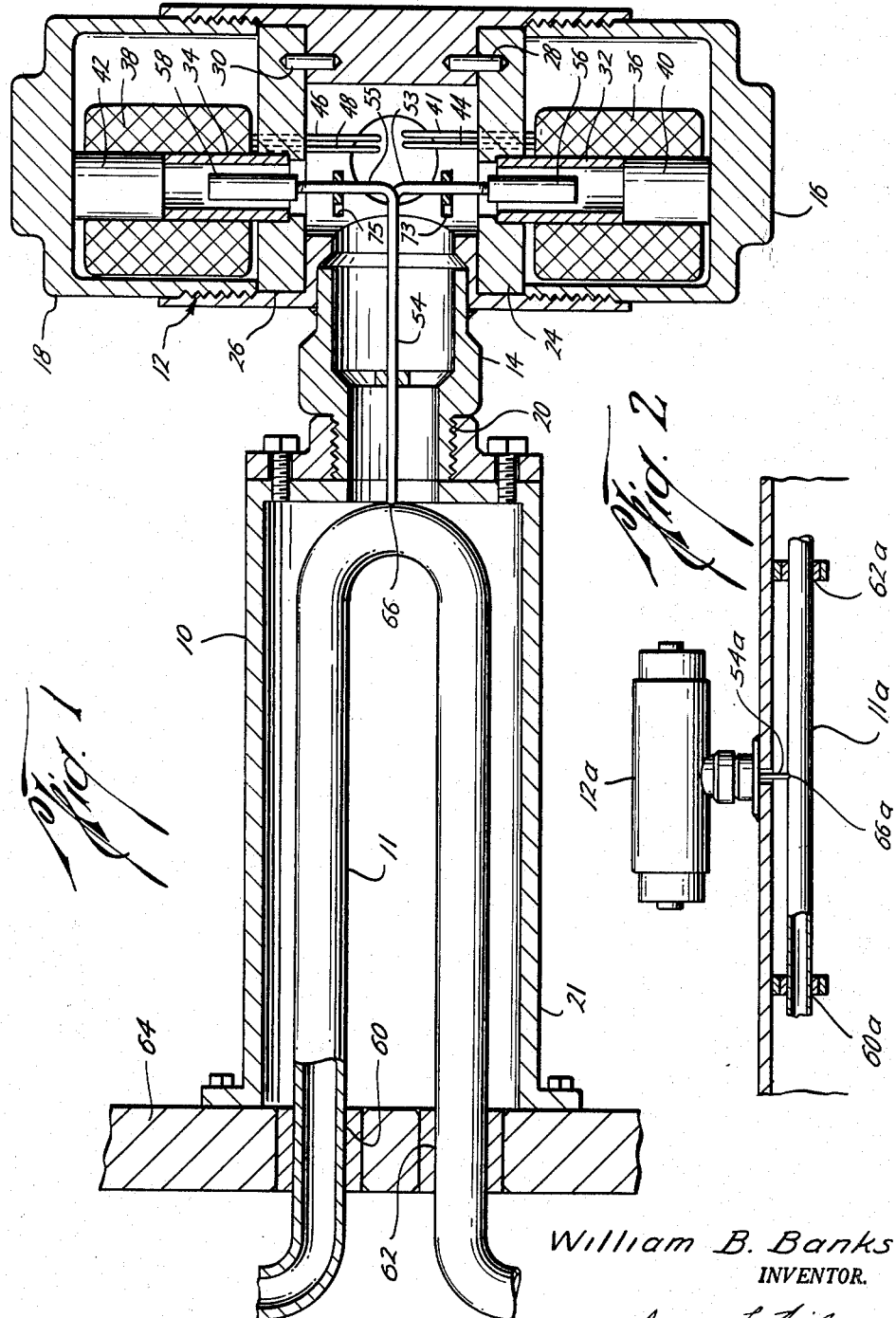

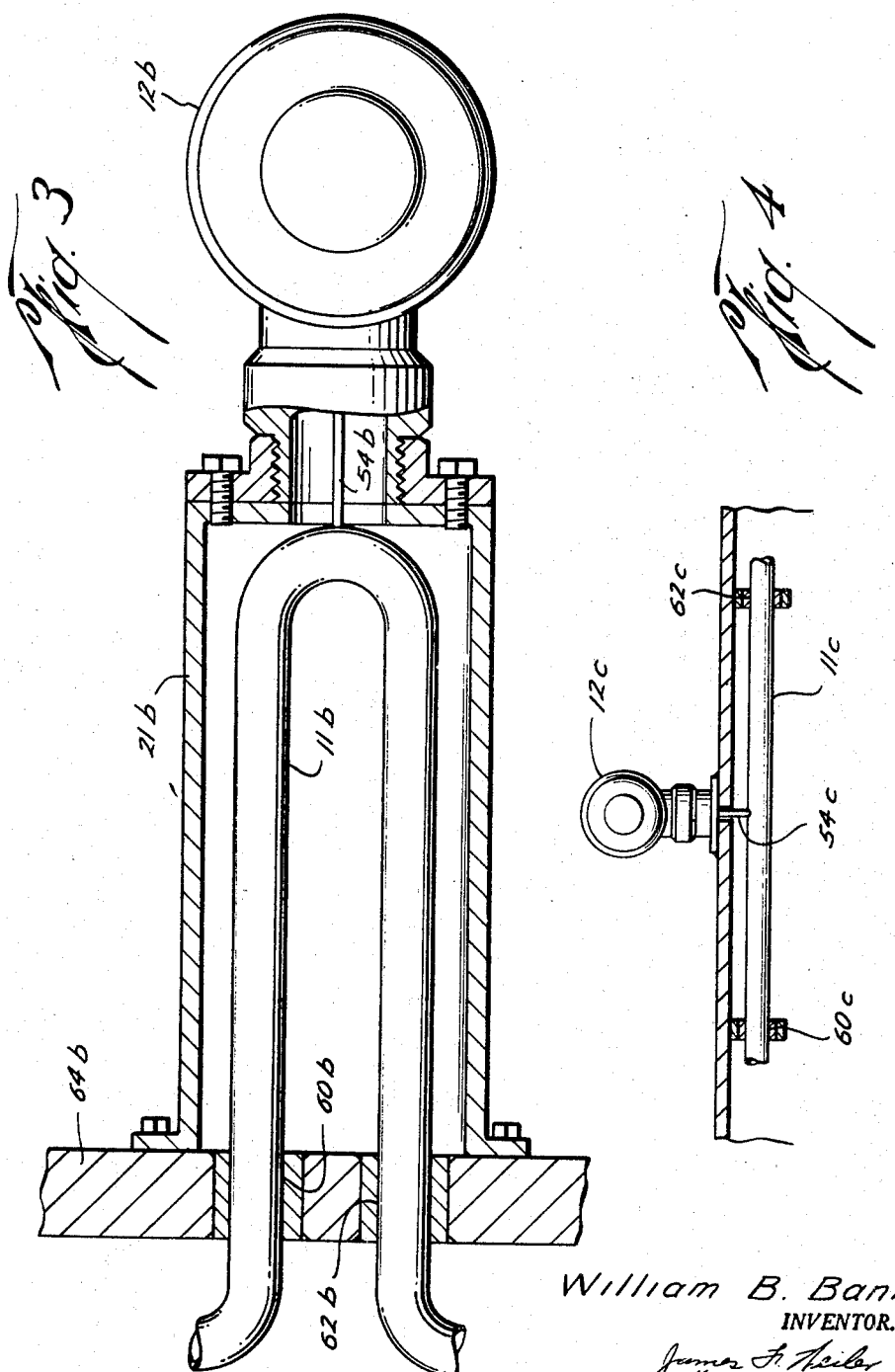

3,177,705
APPARATUS FOR DETERMINING VISCOSITY OF MATERIALS
William B. Banks, Houston, Tex., assignor to Automation Products, Inc., Houston, Tex., a corporation of Texas
Filed June 1, 1961, Ser. No. 114,101
2 Claims. (Cl. 73—54)

The present invention relates to an apparatus for determining viscosity of materials, and more particularly, relates to an apparatus for the indication and control of the value or changes in the viscosity of materials.

This application is complementary to my patent for a Mass Presence Sensing Device, No. 2,973,639 and my co-pending patents, Numbers 3,100,390 and 3,145,559.

The present invention is particularly useful in measuring the viscosity of flowing materials and can be used with liquids, gasses, and flowable solids.

The apparatus of the present invention is generally directed to providing a hollow body in which to contain the material to be measured, vibrating that hollow body, and thus the material, and measuring the vibration of the body whereby the value or change in the viscosity of the material in the hollow body is measured or detected.

It is therefore a general object of the present invention to provide an improved apparatus for determining viscosity of materials by providing a hollow body for holding said materials, vibration means connected to the body for vibrating the body, and vibration detecting means connected to the body for detecting a change in the vibration of the body, and means for supporting the body.

A further object of the present invention is the provision of an apparatus for determining viscosity of a material which is flowing under pressure without interfering with processing of the materials.

A further object of the present invention is the provision of an improved apparatus for determining viscosity of materials by providing a tubular body for conducting a flowing material, vibration means and vibration detecting means connected to the body for initiating and measuring the amplitude of vibration of the body, and support means supporting the body at two points spaced from the point of connection of the vibration means, said two points being approximate the node points of the natural resonant frequency of the body.

Yet a still further object of the present invention is the provision of an apparatus for determining physical properties of a flowing material by providing a U-shaped body for conducting such material which is vibrated, the change in vibration of the body is measured, and thus a specific physical property of the flowing material such as the weight, specific gravity, or density may be measured while the material is being conducted through the body under pressure.

Yet a further object of the present invention is the provision of an apparatus for determining viscosity of a flowing material by providing a straight tubular body, vibration and amplitude detecting means connected to the body, the body being supported on either side of the connection to the vibration means at points spaced from the connection points of approximately one quarter of the wave lengths of the applied vibrations whereby very sensitive measurments are obtained.

Other and further objects, features and advantages will be apparent from the following description of presently preferred embodiments of the invention, given for the purpose of disclosure, and taken in conjunction with the accompanying drawings, where like character references designate like parts throughout the several views in where, FIGURE 1 is an elevational view, partly in section, illustrating one form of the present invention in which a U-shaped tubular body is being vibrated in a longitudinal direction to the axis of the body, FIGURE 2 is a side elevational view, partly in cross section, of a straight tubular body being vibrated in a longitudinal direction along its axis, FIGURE 3 is a side elevational view, partly in cross section, of a U-shaped tubular body being vibrated in a direction transverse to the axis of the body, and FIGURE 4 is an elevational view of a straight tubular body being vibrated in a direction transverse to the axis of the body.

The present invention is generally directed to providing a hollow body which is adapted to contain a material to be measured. The body and its contained material is then vibrated, preferably at its resonant frequency for maximum sensitivity. The vibration of the body containing the material is then measured which will be an indication of the value or change in the value of the physical property being measured. By vibrating the body in a transverse direction in relation to the material the physical property of the weight or change in weight in the material may be measured. And since the volume of the material in the body is known, other physical characteristics such as the specific gravity and density may also be indicated. Furthermore, if the body is vibrated in a direction longitudinal to the material the physical property of viscosity of the material may be measured.

Referring now to the drawings, and particularly to FIGURE 1, the reference numeral 10 generally designates one embodiment of an apparatus for determining physical properties of material, the vibration actuating and vibration detector means which are generally described in my co-pending application, Serial No. 859,302. The apparatus 10 generally includes means for vibrating and means for detecting the vibration of the hollow body 11 through which the material being measured is contained. For ease in manufacturing and maintenance, the vibration means and vibration detecting means, which will be more fully described hereinafter, are enclosed within a housing 12, which includes a central T-shaped tubular portion 14 and tubular side portion 16 and 18.

The central tubular portion 14 is preferably externally threaded at its outer end 20 for threadable connection within a threaded opening to a suitable support apparatus 21. Also connected to the central tubular portion 14 is an internally threaded connection (not shown) for attachment to a suitable electrical conduit (not shown) for containing the electrical connections to the apparatus, which will be more fully discussed hereinafter.

The motor or driver vibration means assembly is enclosed in and located in the housing end 16. A retaining disc 24, which provides a support for the vibrator assembly is supported in the central housing portion 14 by dowel pin 28 or other suitable means and secured in place in the end 16. A tubular nonmagnetic sleeve 32 is supported in the retaining disc 24 by a counter sunk shoulder and extends into the interior of the end 16. Within the end 16 electromagnetic coil 36 surrounds and is supported by the tubular sleeve 32. A magnetic core 40 is located within the electromagnetic coil 36 at one end of the nonmagnetic sleeve 32. Electrical connections 41 and 44 supply electrical current from an external source to the electromagnetic coil 36 which sets up vibrations in the vibratory armature 56 which is connected to and vibrates the hollow body 11 at the frequency of the external source.

The amplitude detecting means or generator assembly is located in the housing end portion 18. A retaining disc 26 provides a support for the vibration detecting means and is secured in the central portion 14 of the housing by dowel pin 30, and in turn supports a nonmagnetic tubular sleeve 34 in the housing end 18. A permanent magnet 42 is disposed within the electromagnetic coil 38 at one end of the nonmagnetic sleeve 34 thus providing a magnetic field for the coil 38. Connected to the electromagnetic coil 38 are electrical connections 46 and 48 which carry the signal generated in the detecting coil to electrical indicating or control means. Any suitable electrical coil control or detecting means may be used such as control relays or indicating volt meters (not shown) which can be used to control the physical property of the material or indicate the value or change in the physical property being measured of the material. Since these control and indicating devices do not constitute part of the invention no further description is deemed necessary.

Thus magnetic armature 56 vibrates in response to the frequency of the electrical voltage applied to the electromagnetic coil 36 and in turn causes the connecting rod 53 to vibrate at this applied or excitation frequency. Connecting rod 55 extends into the tubular element 34 in the amplitude detecting assembly and has a magnetic armature 58 at its end which vibrates and induces a voltage in coil 38 which is indicative of the amplitude of vibration of the connecting arm 55.

The vibration causing armature 56 and the vibration detecting armature 58 are connected through their connecting arms 53 and 55, respectively, to the body 11 in order to vibrate the body 11 in a plane containing both legs of the U-shaped body 11 and the material which it contains and to detect the change in the amplitude of vibration upon a change in the physical property of the material passing through the body 11. Thus, the armatures 56 and 58 are suitably connected to the hollow body 11. For ease of construction the connecting arms 53 and 55 may be connected to a flexible element 54 which is in turn secured to the hollow body 11. Of course, the flexible element 54 may be omitted and the body 11 connected directly to the connecting arms 53 and 55.

Guides 73 and 75 are secured to the interior of the central portion of the housing 14 and include an opening which slidably receives and guides rod extensions 53 and 55, respectively. The guides limit the direction of vibration of the rods 53 and 55 thereby insuring that extraneous motion is not introduced into the vibrating elements of the apparatus to clutter up the signal received.

Thus, when the armature 56 is vibrated in response to the electrical signal applied to the electrical conductors 41 and 44 the body 11 and the material passing through the body will vibrate in accordance with that signal. Furthermore, the amplitude measuring armature 58 will also vibrate in response to the vibration of the body 11 and induce a signal in electrical conductors 46 and 48. In order to achieve the maximum sensitivity, the body 11 may be vibrated at approximately its natural resonant frequency. To prevent dampening of the vibrations the body 11 is supported at points 60 and 62 by suitable support means 64. The supports 60 and 62 are positioned at the node points of the natural resonant frequency of the body 11, that is, the supports 60 and 62 are spaced a quarter of a wave length from the point of connection 66 of the vibration means to the body 11. Thus, when the body 11 is vibrated at its natural resonant frequency by the vibration armature 56 about its node points 60 and 62 the amplitude of the vibration of the body 11 and consequently its sensitivity will be at a maximum. Thus, the value or changes in the physical properties of the material flowing through the body 11 will affect the natural resonant frequency of the body 11 causing a change in the vibration of the body 11 which is transmitted to the amplitude measuring armature 58.

The body 11 is shown in FIGURE 1 as a U-shaped tubular body. This body is suitable for insertion in the usual process structure of the material. Thus flowing material which is under pressure can be effectively measured without interfering with the processing of the material. Of course, the material need not be flowing and any suitably shaped hollow body may be used to contain and determine the physical properties of static material.

Of course, various modifications of this apparatus may be made which include vibrating means transmitting vibration to a material conducting body which in turn transmits vibration to an amplitude measuring means thereby measuring values and changes in a physical property of the material flowing through the body. FIGURES 2, 3, and 4 illustrate modifications of the present invention, the letters "a," "b," and "c" being applied to parts generally corresponding to those in FIGURE 1 for convenience of reference.

Referring now to FIGURE 2, a further improvement of the present invention is shown in which the hollow body 11b is in the form of a straight tubular body instead of being U-shaped as in FIGURE 1. In this embodiment the vibration means vibrates the arm 54a in a direction longitudinally of the axis of the member 11a. Thus as the body 11a is being vibrated longitudinally of the flow of the material through the body 11a the viscosity of the material is being measured.

Referring now to FIGURE 3, the apparatus is identical to that disclosed in FIGURE 1 with the exception that the vibration applied to the U-shaped tubular body 11b is applied in a direction transverse to a plane containing both legs of the body 11b. The apparatus shown in FIGURE 3 is the preferred embodiment for measuring such physical properties of the material flowing through the body as the weight of the material. Also since the volume of the material is known from the dimensions of the body 11b, the physical properties of the density and specific gravity are being measured.

Referring now to FIGURE 4, the apparatus is identical to the structure shown in FIGURE 2 with the exception that the vibration applied to the straight tubular body 11c is perpendicular to the axis of the body 11c. This particular structure is useful in measuring the value or change in physical properties of weight, density or specific gravity of the material flowing through the body 11c.

Generally in the operation of the present invention, a suitable electric source is connected by the electrical conductors 41 and 44 to the electromagnetic coil 36 which constitutes the vibration means by which the hollow body 11 is caused to vibrate. When the electromagnetic coil 36 is energized by an alternating current the vibration armature 56 is attracted and released so as to cause the vibratory connecting arm to vibrate at the frequency of the applied electric source. Of course, other means of causing vibrations could be used. Thus, the vibration of the connecting arm 53 is transmitted from its armature to the hollow body 11 through a connecting arm 54 if desired. The vibration of the hollow body 11 is transmitted through the arm 54 to the connecting arm 55 and to the amplitude vibrating armature 58. The electromagnetic or pickup coil 38 thus generates a voltage caused by the vibration of the armature 58 in the magnetic field of the permanent magnet 42. The signal from this detecting or pickup coil 38 is transmitted through electrical conductors 46 and 48 to any suitable type of electrical circuit having electrical indicating or control means (not shown). Thus the value or changes in the physical properties of the material which passes thru the hollow body 11 affect the amplitude of vibration of the hollow body 11 which is reflected and transmitted to the amplitude detecting armature 58.

Generally a sixty cycle alternating source is applied to the electromagnetic coil 36, thus vibrating a body 11 at sixty cycles. A sixty cycle vibration frequency results in a one hundred and twenty cycle per second vibration of the body 11. Of course, the natural resonant frequency of the body 11 may be selected, as disclosed in my co-pending application, Serial No. 859,302, in relation to the excitation frequency to determine the operational characteristics of a given instrument. That is, by selecting the natural resonant frequency of the body equal to the excitation vibration the sensitivity of the device will be at a maximum. Preferably, for measuring such physical characteristics as weight, density, specific gravity and viscosity, it is preferable to have the natural resonant frequency of the body equal to the excitation frequency when the body contains the material being measured so that comparatively small change in a physical property will result in comparatively large change in the detected output.

It is noted that the shape of the tubular member and the direction of its vibration also determine what physical properties it will measure and its sensitivity. Thus, FIGURES 3 and 4 wherein the tubular bodies 11b and 11c are vibrated transverse to their axis are especially suitable for measuring the physical properties of a flowing material, such as weight, density and specific gravity. The apparatus of FIGURE 2 wherein the tubular body 11a is vibrated longitudinally along its axis is particularly suited for measuring the viscosity of the flowing material which passes through the body 11a.

It is also particularly noted that the present invention may be applied to material processing equipment without interfering or slowing down the processing of the material and is also capable of measuring the physical properties of a flowing material when it is under high pressures.

The present invention, therefore, is well adapted to carry out the objects and attain the ends and advantages mentioned as well as others inherent therein. The presently preferred embodiments of the invention are given for the purpose of disclosure, and numerous changes in the details of construction, and arrangement of parts may be made which will readily suggest themselves to those skilled in the art and which are encompassed within the spirit of the invention and the scope of the pending claims.

What is claimed is:

1. An apparatus for measuring the viscosity of a flowing material comprising, a straight tubular body for conducting said flowing material, vibration means connected to the body for vibrating the body in a longitudinal direction, vibration detecting means connected to the body for detecting a change in the longitudinal vibration of said body, and support means supporting the body at two points which are on opposite sides to the point of connection to the vibration means to the body.

2. The invention of claim 1 wherein the two points are approximately a node point of the natural resonant frequency of the body.

References Cited by the Examiner

UNITED STATES PATENTS

| | | | |
|---|---|---|---|
| 2,340,992 | 2/44 | Siegel | 73—59 |
| 2,839,915 | 6/58 | Roth et al. | 73—59 |
| 2,943,476 | 7/60 | Bernstein | 73—32 |
| 3,062,040 | 11/62 | McKennell et al. | 73—59 |

RICHARD C. QUEISSER, *Primary Examiner.*

CHARLES C. CUTTING, JOSEPH P. STRIZAK,
*Examiners.*